United States Patent
Lee et al.

(10) Patent No.: US 7,903,627 B2
(45) Date of Patent: Mar. 8, 2011

(54) METHOD FOR GENERATING BURST IN A COMMUNICATION SYSTEM

(75) Inventors: Hee-Kwang Lee, Anyang-si (KR); Jung-Won Kim, Seoul (KR); Jae-Ho Jeon, Seongnam-si (KR); Seung-Joo Maeng, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 307 days.

(21) Appl. No.: 12/074,170

(22) Filed: Feb. 29, 2008

(65) Prior Publication Data
US 2008/0219161 A1    Sep. 11, 2008

(30) Foreign Application Priority Data

Mar. 2, 2007   (KR) .................. 10-2007-0021188

(51) Int. Cl.
*H04J 1/00* (2006.01)
(52) U.S. Cl. ................. 370/343; 370/208; 370/480
(58) Field of Classification Search .............. 370/230, 370/231, 132, 233, 234, 235, 349, 395.4, 370/395.41, 395.42, 395.43
See application file for complete search history.

(56) References Cited

U.S. PATENT DOCUMENTS

| | | | |
|---|---|---|---|
| 2005/0047416 A1* | 3/2005 | Heo et al. | 370/395.4 |
| 2005/0201269 A1 | 9/2005 | Shim et al. | |
| 2007/0060149 A1 | 3/2007 | Lim et al. | |
| 2007/0140261 A1* | 6/2007 | Wang et al. | 370/395.42 |
| 2009/0086686 A1* | 4/2009 | Rudolf et al. | 370/336 |

FOREIGN PATENT DOCUMENTS

| | | |
|---|---|---|
| KR | 1020060037101 A | 5/2006 |
| KR | 1020060044327 A | 5/2006 |
| KR | 10-2006-0091158 | 8/2006 |
| KR | 1020070016208 A | 2/2007 |

OTHER PUBLICATIONS

Office Action dated Feb. 25, 2010 in connection with Korean Patent Application No. 10-2007-0021188.

* cited by examiner

*Primary Examiner* — Huy D Vu
*Assistant Examiner* — Dady Chery

(57) ABSTRACT

A method for generating a burst in a communication system. The method includes estimating a first allocable PDU according to scheduling priority; generating a first burst in which the first PDU is to be included; and determining whether a total size of bursts to be allocated to a downlink subframe including the generated first burst is less than a maximum size of bursts allocable to the downlink subframe.

20 Claims, 8 Drawing Sheets

METHOD FOR GENERATING BURST IN A COMMUNICATION SYSTEM

CROSS-REFERENCE TO RELATED APPLICATION(S) AND CLAIM OF PRIORITY

This application claims the benefit under 35 U.S.C. §119 (a) of a Korean Patent Application filed in the Korean Intellectual Property Office on Mar. 2, 2007 and assigned Serial No. 2007-21188, the disclosure of which is incorporated herein by reference.

TECHNICAL FIELD OF THE INVENTION

The present invention relates to a method for generating a burst during downlink burst allocation in a communication system.

BACKGROUND OF THE INVENTION

In the 4th Generation (4 G) communication system, which is the next generation communication system, intensive research is being conducted to provide users with services having various Qualities-of-Service (QoSs) at a data rate of about 100 Mbps. In particular, a study of the 4 G communication system is now made to support high-speed services in the way of guaranteeing mobility and QoS for a Broadband Wireless Access (BWA) communication system such as wireless Local Area Network (LAN) system and wireless Metropolitan Area Network (MAN) system, and an Institute of Electrical and Electronics Engineers (IEEE) 802.16 communication system is the typical 4 G communication system.

The IEEE 802.16 communication system is a communication system employing Orthogonal Frequency Division Multiplexing (OFDM) or Orthogonal Frequency Division Multiple Access (OFDMA) to support a broadband transmission network for physical channels of the wireless MAN system. OFDM/OFDMA transmits multiple subcarriers with orthogonality maintained, making it possible to obtain the optimal transmission efficiency during high-speed data transmission. In addition, OFDM/OFDMA can obtain the optimal transmission efficiency during high-speed data transmission since it has high frequency efficiency and is robust against multi-path fading. As an example of the communication system using OFDMA, there is Wireless Broadband (WiBro), which is 2.3 GHz Portable Internet Service.

In a OFDMA communication system, proper distribution of resources is required to increase channel utilization between a base station (BS) and multiple mobile stations located in a cell. The optimal channel utilization is guaranteed according to the way of channelizing subcarriers, which are kinds of sharable resources, and allocating the subcarriers to the mobile stations in the cell. A set of at least one subcarrier is a subchannel.

Data transmission of the communication system is achieved on a frame-by-frame basis, and each frame is divided into a downlink (DL) data interval capable of transmitting DL bursts and an uplink (UL) data interval capable of transmitting UL bursts. The DL and UL data intervals each are divided in units of slots, each of which is a time-frequency two-dimensional arrangement.

DL bursts occupying multiple time slots are allocated to the DL data interval. Specifically, in the IEEE 802.16 communication system, bursts are generated in the following 3 methods during downlink data burst allocation.

A first method generates one protocol data unit or packet data unit (PDU) [Connection ID (CID)] as one burst, without concatenating multiple PDU[CID]s.

A second method generates one burst by concatenating PDU[CID]s of the same terminal (or mobile station). That is, this method generates one burst by concatenating PDU [CID]s having the same terminal identifier (or Basic Cid (CID)).

A third method generates one burst by concatenating PDU [CID]s having the same Modulation and Coding Scheme (MCS) level. In this case, it does not matter whether the PDU[CID] s are PDU[CID] s of the same terminal, or PDU [CID]s of different terminals.

In the first method and the second method, a MAP size increases with the number of terminals undesirably. In the third method, a size of the data burst that a terminal has received from a base station may increase so that the terminal cannot decode the received data burst.

SUMMARY OF THE INVENTION

To address the above-discussed deficiencies of the prior art, it is a primary object of the present invention to address at least the problems and/or disadvantages and to provide at least the advantages described below. Accordingly, an aspect of the present invention is to provide a method for reducing a MAP size increased due to the concatenation of PDU[CID]s during downlink burst allocation, and generating a burst with a suitable size, decodable by a terminal, in a communication system.

According to one aspect of the present invention, there is provided a method for generating a burst in a communication system. The method includes estimating a first allocable PDU according to scheduling priority; generating a first burst in which the first PDU is to be included; and determining whether a total size of bursts to be allocated to a downlink subframe including the generated first burst is less than a maximum size of bursts allocable to the downlink subframe.

According to one aspect of present invention, there is provided a method for use in a wireless network capable of communicating with a plurality of mobile stations, a base station for generating a burst to be transmitted to the plurality of mobile stations. The method includes estimating a first allocable PDU according to scheduling priority, generating a first burst in which the first PDU is to be included and determining whether a total size of bursts to be allocated to a downlink subframe including the generated first burst is less than a maximum size of bursts allocable to the downlink subframe.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

The present invention provides a method for reducing a MAP size increased due to the concatenation of PDU[CID]s during DL data burst allocation, and generating a burst with a suitable size, decodable by a terminal, in a BWA communication system.

Specifically, a base station (BS) calculates the number of and a size of bursts to be allocated to a terminal, taking into account the number of its encodable bits per burst and the number of bits per frame, decodable by the terminal.

Herein, for convenience, the maximum number of bytes per burst, encodable by a base station, will be referred to as BS Maximum Byte (BM), and the maximum number of bytes per frame, decodable by a terminal or mobile station (MS), will be referred to as MS Maximum Byte (MM). The term 'MM [CID]' as used herein refers to MM of a burst having a specific CID, and the term 'MM [group]' represents the minimum MM, Min(MM[cid-1], MM[cid-2], . . . , MM[cid-n]), among the MMs included in a group composed of N CIDs included in the corresponding burst.

The present invention generates bursts in the following method on the condition that BM is greater than MM (BM>MM).

Figure 1:
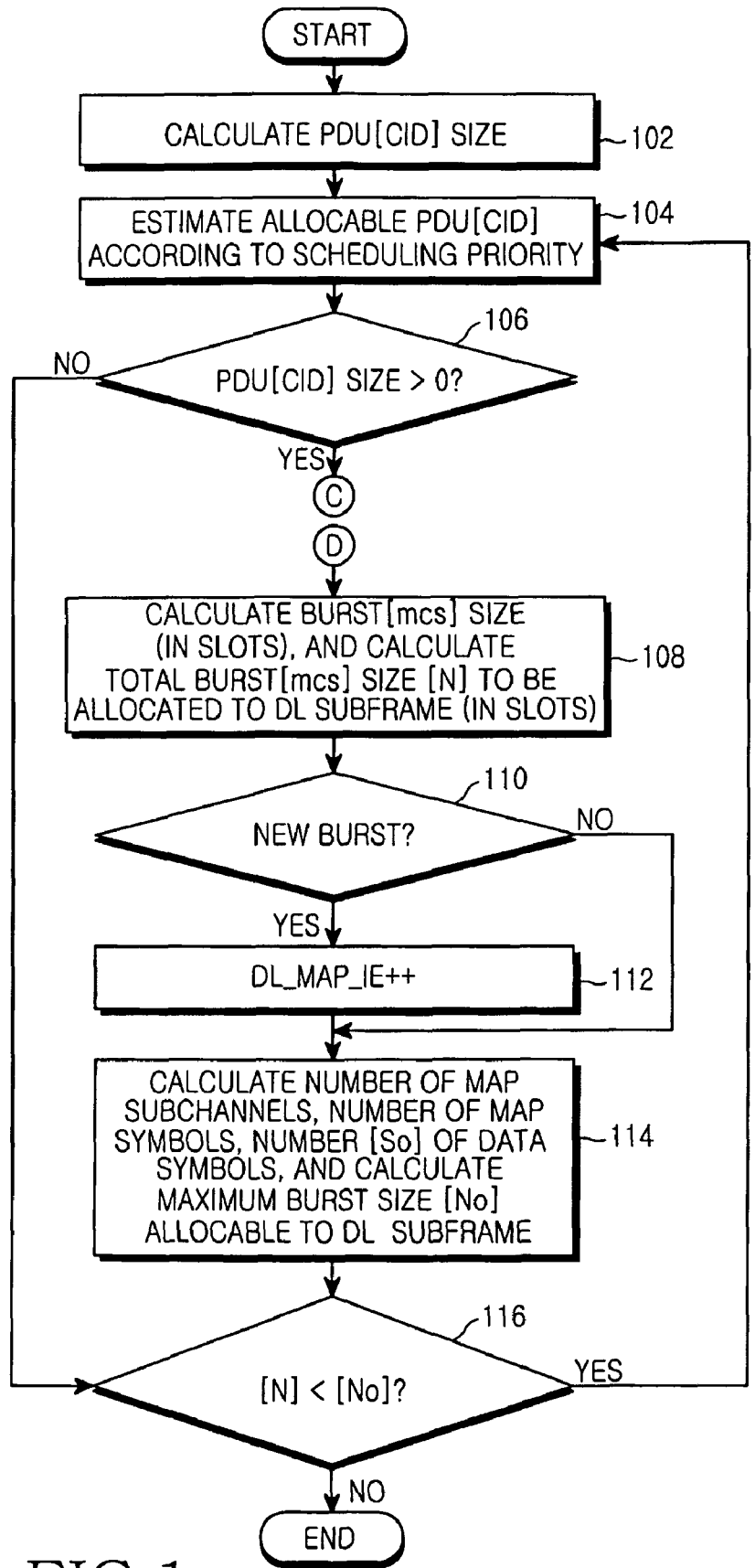
FIG. 1 is a flowchart illustrating an operation of a base station according to embodiments of the present invention.

FIG. 1 is a flowchart illustrating an operation of a base station according to embodiments of the present invention.

Referring to FIG. 1, in step 102, a base station calculates a size of each PDU[CID] on a byte-by-byte basis. In step 104, the base station estimates an allocable PDU[CID] according to the scheduling priority. In step 106, the base station determines whether a size of the estimated PDU[CID] is greater than 0. If the size of the estimated PDU[CID] is greater than 0, the base station performs processes (C)~(D) (steps 202 to 236 of FIGS. 2 and 3). However, if the size of the estimated allocable PDU[CID] is less than or equal to 0, the base station proceeds to step 116.

A detailed description of the processes (C)~(D) will be given below with reference to FIGS. 2 and 3.

In step 108, the base station calculates a size Burst [mcs] of a burst including the estimated PDU[CID] and the total size [N] of bursts to be allocated to a DL subframe on a slot-by-slot basis, and then proceeds to step 110. The '[mcs]' indicates an MCS level of the corresponding burst.

In step 110, the base station determines whether the burst including the estimated PDU[CID] is a new burst. If it is determined that the burst including the estimated PDU[CID] is a new burst, the base station increases DL_MAP_IE (Information Element) by one in step 112, and then proceeds to step 114. However, if it is determined that the corresponding burst is a burst concatenated to the burst including the estimated PDU[CID], the base station jumps to step 114.

In step 114, the base station calculates the number of MAP subchannels, the number of MAP symbols, the number [So] of data symbols, and the maximum size [No] of bursts allocable to a DL subframe, and then proceeds to step 116. Here, a value of the DL_MAP_IE is a variable used for determining the number of MAP subchannels, the number of MAP symbols, and the [So]. Therefore, if the DL_MAP_IE value does not increase, none of the number of MAP subchannels, the number of MAP symbols, and the number [So] of data symbols increases.

Although the MAP size is determined using Equation 1 based on PUSC (Partial Usage of Sub Channels), by way of example, another scheme such as FUSC (Full Usage of Sub Channels) can also be applied:

$$\text{Number of MAP bits} = 120 + 204 + 12 + 36 + 44 * DL\_MAP\_IE\_cnt + 16 * TOTAL\_CID\_IN\_DL\_MAP + 32 * UL\_MAP\_IE\_cnt + 44 * DL\_STC\_ZONE\_IE + 52 * UL\_STC\_ZONE\_IE \quad [\text{Eqn. 1a}]$$

In Equation 1a, DL_MAP_IE_cnt denotes the number of DL_MAP_IEs to be allocated to the DL subframe, and TOTAL_CID_IN_DL_MAP denotes the total number of CIDs included in a DL MAP. Herein, Space Time Coding (STC) is used to obtain transmission diversity gain in DL, and DL_STC_ZONE_IE and UL_STC_ZONE_IE denote the number of STC-processed IEs of DL and UL, respectively. In addition, the exemplary constants used herein mean a bit size of each of parameters used in the compressed MAP scheme, and a description thereof will be omitted herein, since they are not related to the gist of the present invention.

$$\text{Number of MAP subchannels} = \text{ceil (Number of MAP bits}/48) * 6 + 4(FCH); \quad [\text{Eqn. 1b}]$$

$$\text{Number of MAP symbols} = \text{Ceil (Number of MAP subchannels}/30 \text{ (Maximum number of subchannels per symbol)})*2; \quad [\text{Eqn. 1a}]$$

$$\text{Number [So] of data symbols} = 27 - (1(\text{Preamble}) + \text{Number of MAP Symbols}); \quad [\text{Eqn. 1d}]$$

$$\text{Maximum number [No] of slots allocable to DL subframe} = 30(\text{Maximum number of subchannels per symbol})*So/2. \quad [\text{Eqn. 1e}]$$

Herein, the number of DL_MAP_IEs and UL_MAP_IEs is determined according to allocation information of a desired transmission DL MAP burst and allocation information of a desired transmission UL MAP burst, respectively. A DL frame is divided into subframes, and each of the subframes includes a MAP region and a data burst region.

As described above, the number of MAP symbols for the MAP region and the number [So] of data symbols for the data burst region are determined using Equation 1 during burst allocation. After calculating the number of MAP symbols and the number [So] of data symbols, the base station allocates bursts in the corresponding data burst region according to the calculated [So].

Generally, in the DL frame, a preamble region is composed of one symbol, and the number of UL_MAP_IEs and DL_MAP_IEs in one frame interval is determined as the number of UL bursts and DL bursts that should be transmitted in the corresponding frame interval, respectively. The number of UL_MAP_IEs and the number of DL_MAP_IEs are subject to change according to the concatenation/non-concatenation of the bursts.

In step 116, the base station compares a value of the total size [N] of bursts to be allocated to the corresponding subframe of the DL frame with a value of the maximum size [No] of bursts allocable to the subframe. If the [N] value is less than the [No] value as a result of the comparison, the base station returns to step 104 where it estimates an allocable PDU[CID] having the next scheduling priority.

However, if the [N] value is greater than or equal to the [No] value as a result of the comparison, the base station ends the procedure for estimating an allocable PDU[CID] according to the scheduling priority.

Figure 2:
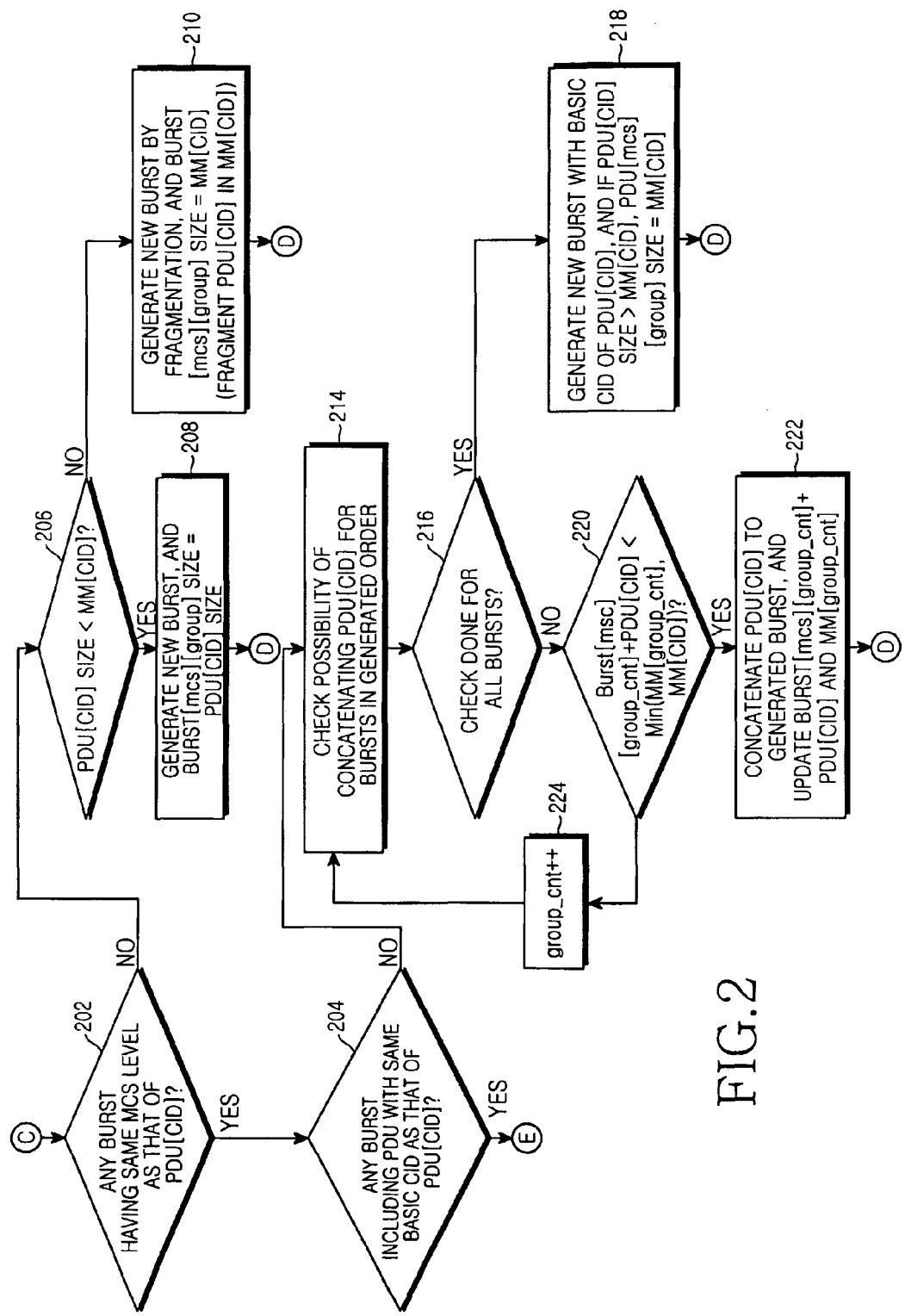
FIG. 2 is a flowchart illustrating an operation of a base station according to embodiments of the present invention.

FIG. 2 is a flowchart illustrating an operation of a base station according to embodiments of the present invention.

Referring to FIG. 2, in step 202 (C), the base station determines whether there is any burst including a PDU[CID] having the same Modulation & Coding Selection Level (MCS) level as that of the allocable PDU[CID] estimated according to the scheduling priority. If it is determined that there is a burst including a PDU[CID] having the same MCS level as that of the estimated PDU[CID], the base station proceeds to step 204, and if there is no such burst, the base station proceeds to step 206.

In step 206, the base station determines whether a size of the estimated PDU[CID] is less than the maximum number MM[CID] of bytes per frame, decodable by a terminal scheduled to receive the PDU[CID]. If it is determined that the size of the estimated PDU[CID] is less than MM[CID], the base station generates a new burst Burst [mcs] [group] only with the estimated PDU[CID] in step 208, and then proceeds to step 108 (D) of FIG. 1.

However, if it is determined that the size of the estimated PDU[CID] is greater than or equal to MM[CID], the base station fragments in step 210 the PDU[CID] in the MM[CID] size, generates a new burst Burst [mcs] [group] with the fragmented PDU [CID], and then proceeds to step 108 (D) of FIG. 1.

In step 204, the base station determines whether there is any burst including a PDU[CID] having Basic CID information of the same terminal as that of the estimated PDU[CID], among the bursts having the same MCS level as that of the estimated PDU[CID]. If it is determined that there is any such burst, the base station proceeds to step 212 (E). A detailed description of steps 212 to 236 is given with reference to FIG. 3. However, if it is determined that there is no such burst, the base station proceeds to step 214.

In step 214, the base station checks whether there is any burst to which it can concatenate the estimated PDU[CID] without fragmentation among the bursts having the same MCS level as that of the estimated PDU[CID] in their generated order. In step 216, the base station determines whether it has performed the check of step 214 on all of the bursts having the same MCS level as that of the estimated PDU[CID]. After performing the check on all of the bursts having the same MCS level as that of the estimated PDU[CID], the base station generates in step 218 a new burst having a Basic CID of the PDU[CID], and then proceeds to step 108 (D) of FIG. 1.

In this case, if the size of the estimated PDU[CID] is greater than or equal to MM[CID], the base station generates a burst with the MM[CID] size by fragmenting the estimated PDU [CID].

However, if it is determined in step 216 that the base station has not performed the check of step 214 on all the bursts having the same MCS level as that of the PDU[CID], the base station determines in step 220 whether a size value obtained by concatenating PDU[CID]s constituting the corresponding burst burst[msc] [group] and the estimated PDU[CID] is less than the minimum one of MM[CID] and MM [group], for each of all the bursts having the same MCS level. If it is determined that the size value is less than the minimum value, the base station proceeds to step 222, and if the size value is greater than or equal to the minimum value, the base station proceeds to step 224.

In step 222, the base station generates a new burst by concatenating the estimated PDU[CID] to the PDU[CID]s constituting the burst[msc][group], updates MM [group_cnt], and then proceeds to step 108 (D) of FIG. 1. This burst is a burst to which the base station can concatenate the estimated PDU[CID] without fragmentation, satisfying the condition of step 214. In step 224, the base station increases group_cnt by one, and then proceeds to step 214.

Figure 3:
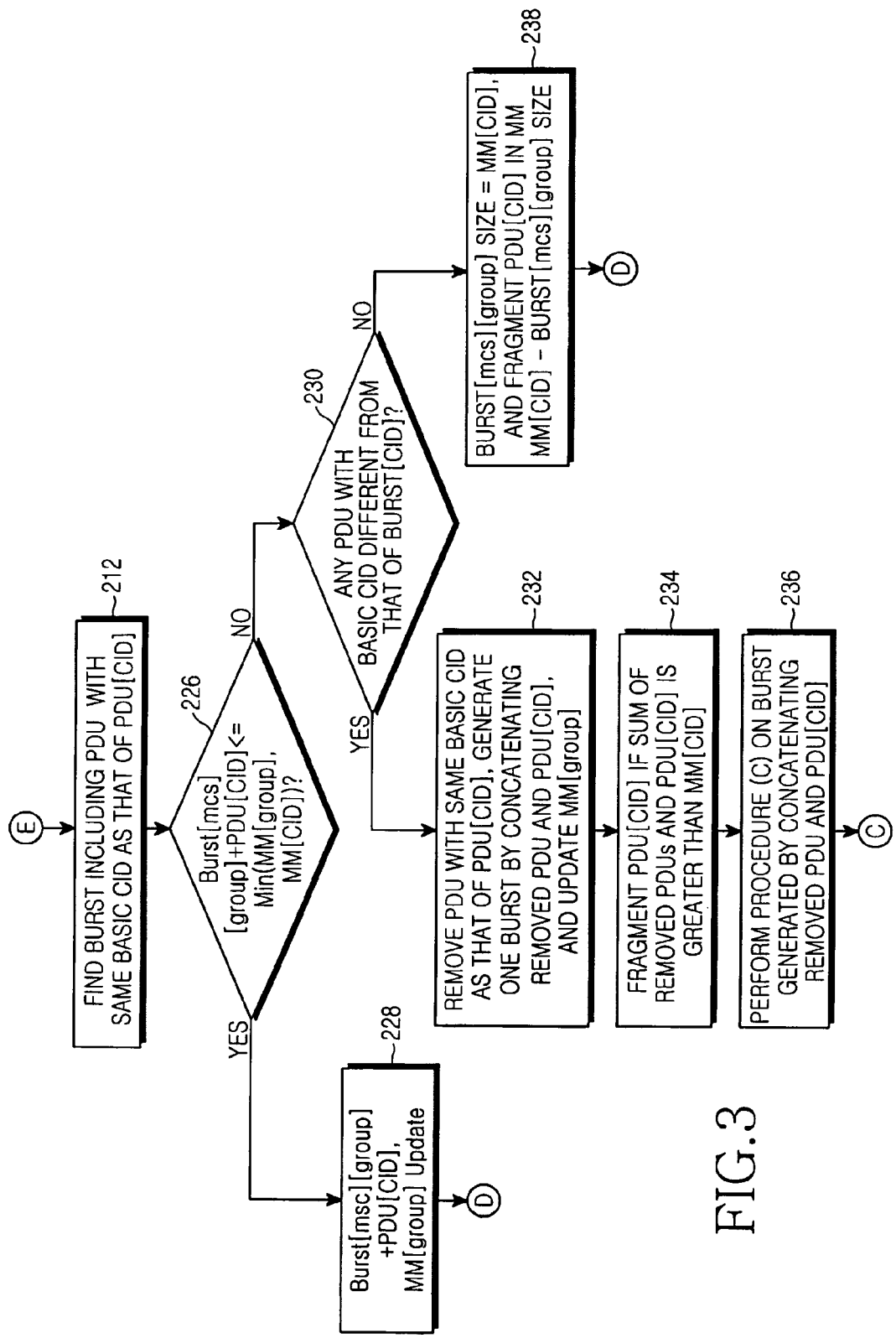
FIG. 3 is a flowchart illustrating an operation of a base station according to embodiments of the present invention.

FIG. 3 is a flowchart illustrating an operation of a base station according to embodiments of the present invention.

Referring to FIG. 3, in step 212, the base station finds a burst Burst[mcs] [group] including a PDU[CID] having Basic CID information of the same terminal as that of the estimated PDU[CID] among the bursts having the same MCS level as that of the estimated PDU[CID].

In step 226, the base station determines whether it can concatenate the estimated PDU[CID] to the PDU[CID]s constituting the Burst [mcs] [group] found in step 212. That is, the base station determines whether the size obtained by concatenating the PDU[CID]s constituting the Burst[mcs] [group] and the estimated PDU[CID] is less than the minimum one of MM[group] and MM[CID] of the burst. If it is determined that a sum of the Burst [mcs] [group] and the estimated PDU[CID] 's size is less than or equal to the minimum value, the base station concatenates the estimated PDU [CID] to the PDU [CID] s constituting the Burst [mcs] [group] in step 228, and then proceeds to step 108 (D) of FIG. 1.

However, if it is determined that the sum of the Burst [mcs] [group] and the estimated PDU [CID] 's size is greater than the minimum value, the base station determines in step 230 whether there is any PDU[CID] having a Basic CID information different a terminal from that of the estimated PDU [CID], in the Burst[mcs][group]. If it is determined that there is no PDU[CID] having a different Basic CID, the base station proceeds to step 238 where it fragments the estimated PDU [CID] in the size obtained by subtracting the PDU[CID]s constituting the Burst[mcs][group] from MM[CID], concatenates the fragmented PDU[CID] to the Burst[mcs][group], and then proceeds to step 108 (D) of FIG. 1. That is, in the case where there is a Burst[mcs][group] including a PDU[CID] with the Basic CID information of the same a terminal as that of the estimated PDU[CID]s among the bursts having the same MCS level as that of the estimated PDU[CID], if there is no PDU[CID] having a Basic CID information different a terminal from that of the estimated PDU[CID], the base station generates a burst with the MM[CID] size by fragmenting and concatenating the PDU[CID]. However, if it is determined that there is a PDU[CID] having a Basic CID information different a terminal from that of the estimated PDU[CID] in the Burst [mcs] [group], the base station removes the PDU

[CID]s having the Basic CID information of the same terminal as that of the estimated PDU[CID] from the Burst[mcs][group] in step 232. Thereafter, the base station generates one burst by concatenating the estimated PDU[CID] to the removed PDU[CID]s, and then proceeds to step 234. That is, the base station generates one burst by concatenating the PDUs having Basic CID information the same terminal Basic CID, and updates the MM[group].

In step 234, if a sum of a total size of the removed PDU[CID]s and a size of the estimated PDU[CID] is greater than MM[CID], the base station fragments the estimated PDU[CID] in a size obtained by subtracting the removed PDU[CID] s from the MM[CID] value, concatenates the fragmented PDU[CID]s to the removed PDU[CID]s to generate a burst with the MM[CID] size, and then proceeds to step 236.

In step 236, the base station performs the procedure of (C)~(D) on the burst generated in step 232.

With reference to FIGS. 4 to 8, a detailed description will now be made of a structure of a burst generated to satisfy the minimum MM value of the corresponding burst so that the terminal generates no error during its burst decoding.

Figure 4:
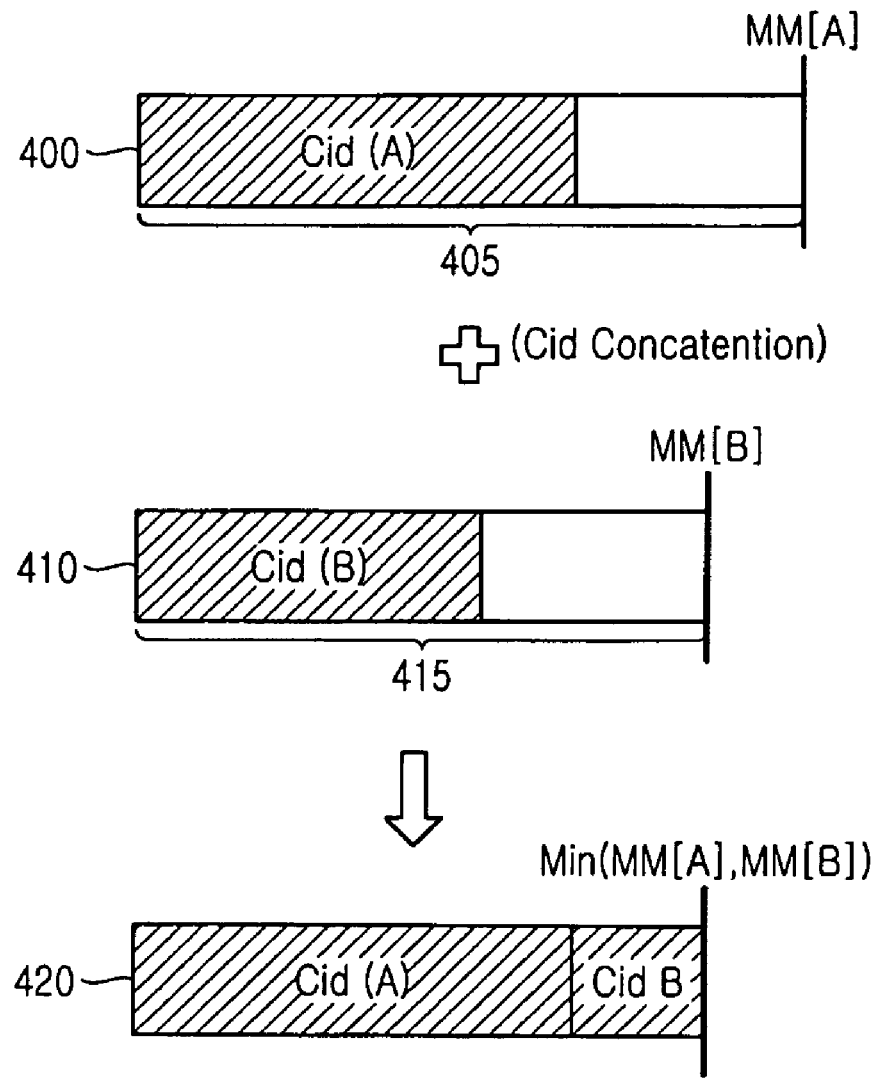
FIG. 4 is a diagram illustrating an exemplary structure of a burst generated by concatenating CIDs of different terminals according to an embodiment of the present invention.

FIG. 4 is a diagram illustrating an exemplary structure of a burst generated by concatenating CIDs of different terminals according to an embodiment of the present invention.

Referring to FIG. 4, a base station determines whether a summed size of a cid(A) 400, or a PDU[CID] with a Basic CID information of a terminal A, and a cid(B) 410, or a PDU[CID] with a Basic CID information of a terminal B, is less than a smaller one of MM[A] 405 and MM[B] 415. If the summed size of the cid(A) 400 and the cid(B) 410 is less than or equal to the size of MM[B] 415, the base station concatenates the cid(A) 400 and the cid(B) 410 to generate one burst 420. If the summed size of the cid(A) 400 and the cid (B) 410 is greater than the size of MM [B] 415, the base station concatenates the cid(A) 400 and fragmented the cid(B) 410 to generate a burst 420 with a size of MM[B] 415.

Figure 5A:
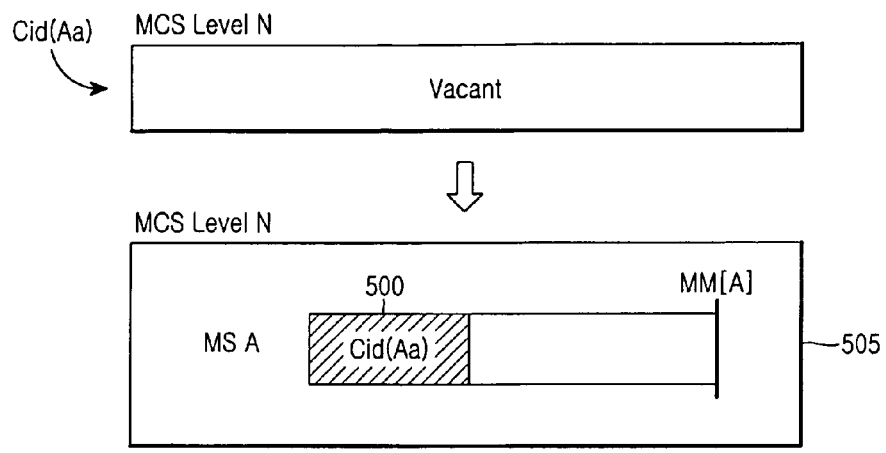
FIGS. 5A and 5B are diagrams illustrating exemplary bursts generated in steps 208 and 210 of FIG. 2 according to an embodiment of the present invention.
Figure 5B:
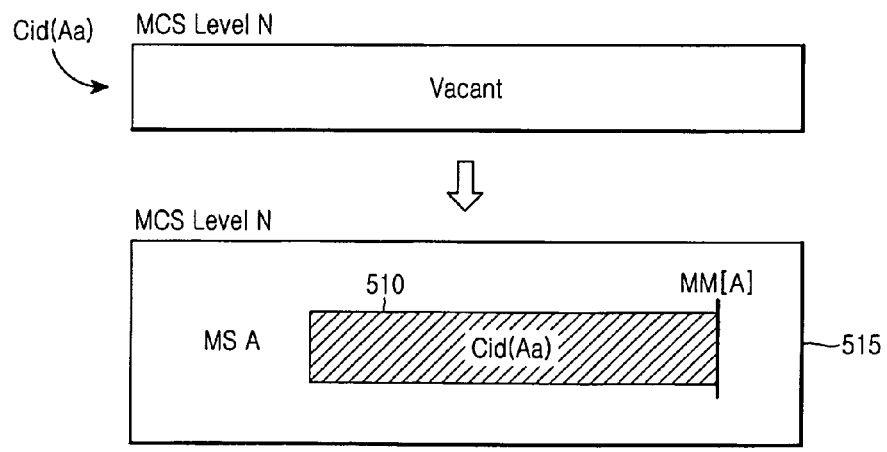

It is shown herein that the summed size of the cid(A) 400 and the cid(B) 410 greater than size of the MM[B] 415. FIGS. 5A and 5B are diagrams illustrating exemplary bursts generated in steps 208 and 210 of FIG. 2 according to an embodiment of the present invention. Referring to FIG. 5A, there is shown a case where for a PDU[CID] estimated to be allocated according to the scheduling priority, there is no burst having the same MCS level N as that of a cid(Aa), or a PDU[CID] having a Basic CID information of a terminal A. For example, in the expression 'cid(Aa)', the uppercase 'A' means terminal indicatior for transmitting the cid(Aa), and the lowercase 'a' is an indicator for indicating each of PDU [CID] s for transmitting to the terminal A. When a size of the cid(Aa) 500 is less than or equal to MM[A], the base station generates a new burst 505 with the cid(Aa) (Step 208 of FIG. 2).

Referring to FIG. 5B, when the size of the cid(Aa) is greater than MM[A], the base station generates a burst 515 with a size of MM[A] 510 by fragmenting the cid(Aa) (Step 210 of FIG. 2).

Figure 6A:
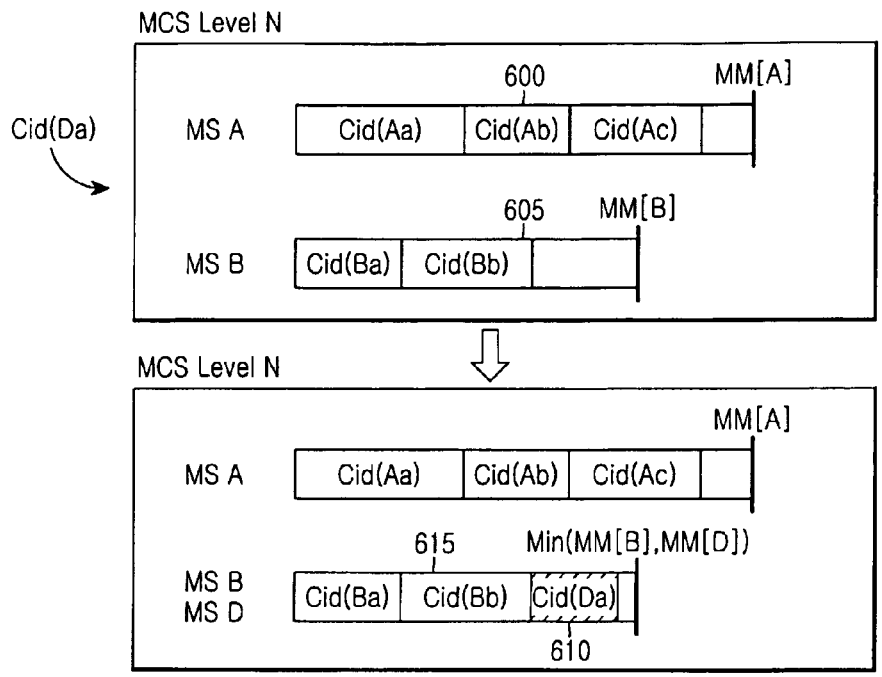
FIGS. 6A and 6B are diagrams illustrating exemplary bursts generated in steps 222 and 218 of FIG. 2 according to an embodiment of the present inventions
Figure 6B:
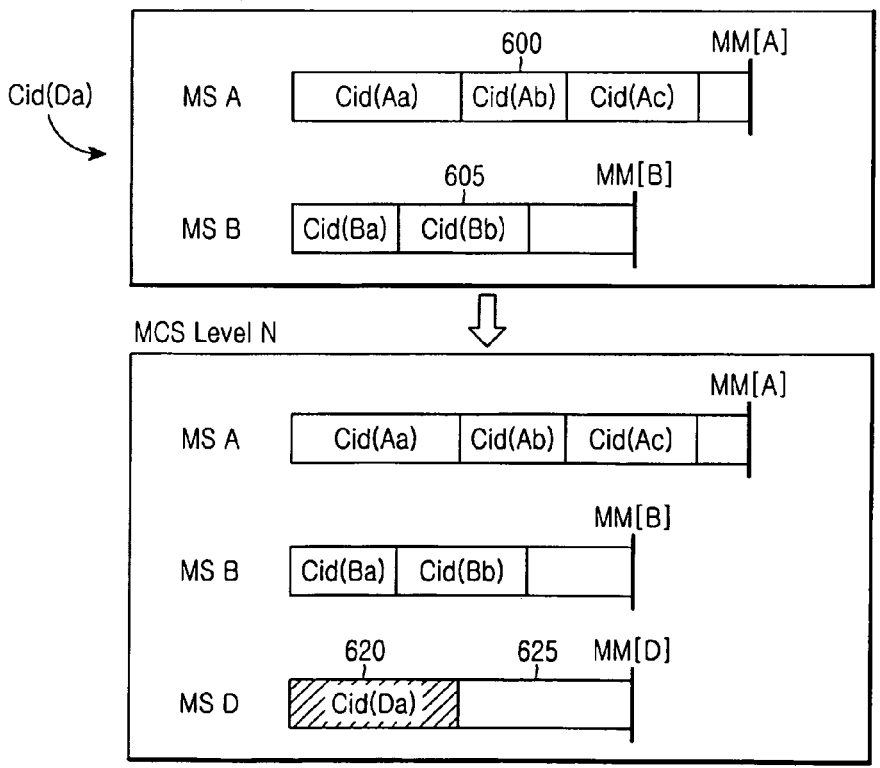

FIGS. 6A and 6B are diagrams illustrating exemplary bursts generated in steps 222 and 218 of FIG. 2 according to an embodiment of the present invention.

Referring to FIG. 6A, there are a first burst 600 and a second burst 605 as bursts having the same MCS level N as that of a cid(Da), or a PDU[CID] with a Basic CID information of a terminal D, estimated to be allocated according to the scheduling priority. The first burst 600 and the second burst 605 each are generated by concatenating PDU[CID]s having a Basic CID information of the same terminal. The first burst 600 is generated by concatenating PDU[CID] s (i.e., cid(Aa), cid(Ab) and cid(Ac)) of terminals having a Basic CID information of a terminal A, and the second burst 605 is generated by concatenating PDU[CID]s, i.e., cid(Ba) and cid(Bb), of terminals having a Basic CID information of a terminal B.

When neither the first burst 600 nor the second burst 605 is a burst having the same Basic CID information of a terminal D as that of the cid(Da), the base station determines whether a size of the burst obtained by adding (concatenating) the cid(Da) to the first burst 600 is less than Min(MM[A], MM[D]), or a size of the burst obtained by adding the cid(Da) to the second burst 605 is less than Min(MM[B], MM[D]).

If it is determined that the size of the burst obtained by adding the cid(Da) to the second burst 605 is less than or equal to Min(MM[B], MM[D])=MM[B], the base station generates a burst 615 by concatenating the cid (Da) 610 to PDU [CID] s of the second burst 605 (Step 222 of FIG. 2).

Referring to FIG. 6B, in case there is a Burst including a PDU[CID] having the same terminal as that of the cid (Da), the base station determines whether a size of the burst obtained by adding the cid(Da) to the first burst 600 is less than Min(MM[A], MM[D]), or a size of the burst obtained by adding the cid(Da) to the second burst 605 is less than Min(MM[B], MM[D]).

If it is determined that the size of the burst obtained by adding the cid(Da) to the first burst 600 is greater than Min(MM [A], MM[D]) and the size of the burst obtained by adding the cid(Da) to the second burst 605 is greater than Min(MM[B], MM[D]) (i.e., if it is not possible to concatenate the cid(Da) to the first burst 600 or the second burst 605 without fragmentation) the base station generates a new burst 625 with the cid(Da), Basic CID information of the terminal D 620, and the new burst 625 has only the Basic CID D.(218 of FIG. 2)

Figure 7A:
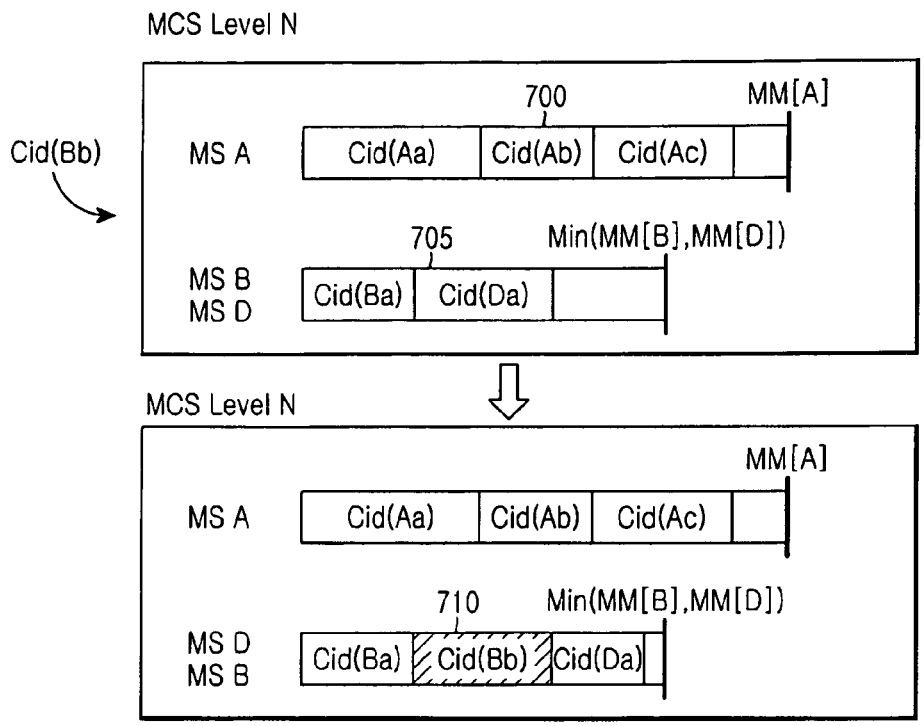
FIGS. 7A and 7B are diagrams illustrating exemplary bursts generated in steps 228 and 238 of FIG. 2.
Figure 7B:
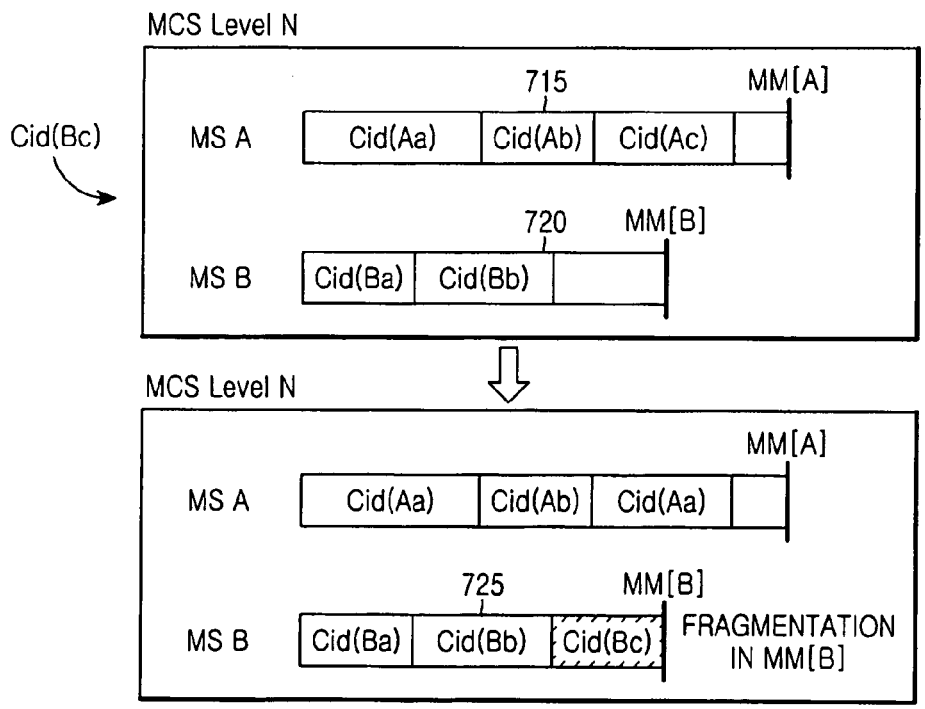

FIGS. 7A and 7B are diagrams illustrating exemplary bursts generated in steps 228 and 238 of FIG. 2.

Referring to FIG. 7A, there are a first burst 700 and a second burst 705 as bursts having the same MCS level N as that of a cid(Bb), or a PDU [CID] with a Basic CID information of a terminal B, estimated to be allocated according to the scheduling priority. The first burst 700 is generated by concatenating only the PDU[CID]s with a Basic CID information of a terminal A (i.e., cid(Aa), cid(Ab) and cid (Ac)) having Basic CID information of a terminal A. The second burst 705 is generated by concatenating a cid(Ba), or a PDU[CID] with a Basic CID information of a terminal B, and a cid(Da), or a PDU[CID] with a Basic CID information of a terminal D. That is, the second burst 705 includes the cid(Ba), or a PDU[CID] having the same Basic CID information of a terminal B as that of the cid(Bb). In this case, if a size obtained by concatenating the PDU[CID]s of the second burst 705 and the cid (Bb) is less than Min (MM [B], MM [D]), the base station generates a burst 710 by concatenating the cid(Ba) and cid (Da) of the second burst 705 (Step 228 of FIG. 3).

Referring to FIG. 7B, there are a third burst 715 and a fourth burst 720 as bursts having the same MCS level N as that of a cid(Bc), or a PDU[CID] estimated to be allocated according to the scheduling priority. The third burst 715 is generated by concatenating PDU[CID]s with a Basic CID information of a terminal A (i.e., cid(Aa), cid(Ab) and cid(Ac)). The fourth burst 720 is generated by concatenating only the cid (Ba) and cid(Bb), which are PDU[CID]s having the same Basic CID information of a terminal B as that of the cid(Bc). In this case, if a summed size of the PDU[CID]s constituting the fourth burst 720 and the cid(Bc) is greater than MM[B], the base station fragments the cid(Bc) in a size obtained by subtracting the cid(Ba) and cid(Bb) from the MM[B], and then concatenates the fragmented cid(Bc) to the cid(Ba) and cid(Bb) of the fourth burst 720 to generate a burst 725 having the MM[B] size (Step 238 of FIG. 3).

Figure 8A:
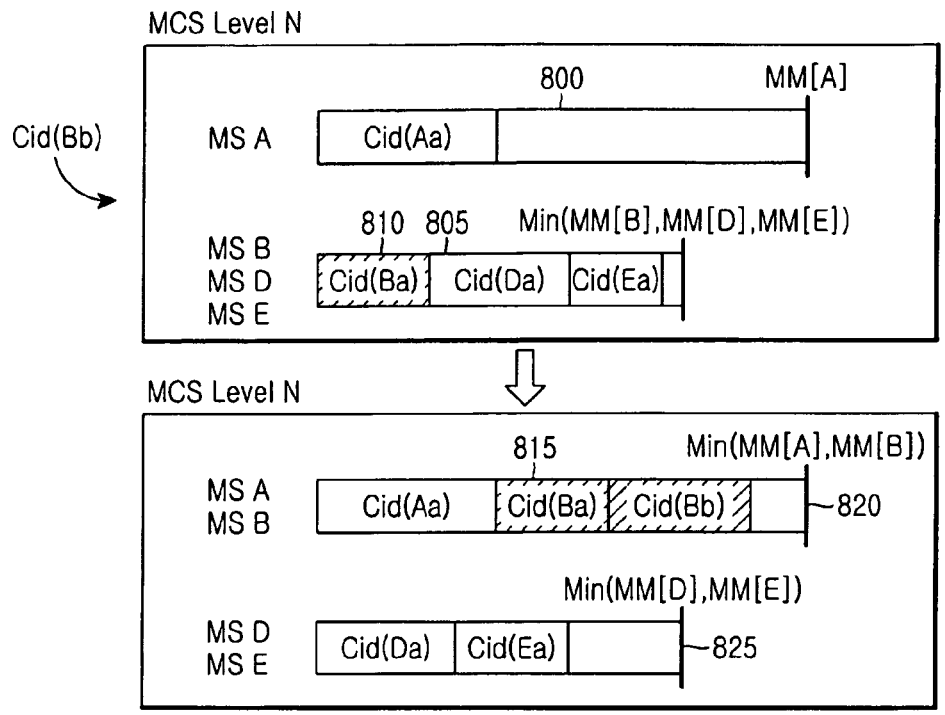
FIGS. 8A and 8B are diagrams illustrating exemplary bursts generated in step 236 of FIG. 2 according to an embodiment of the present invention.
Figure 8B:
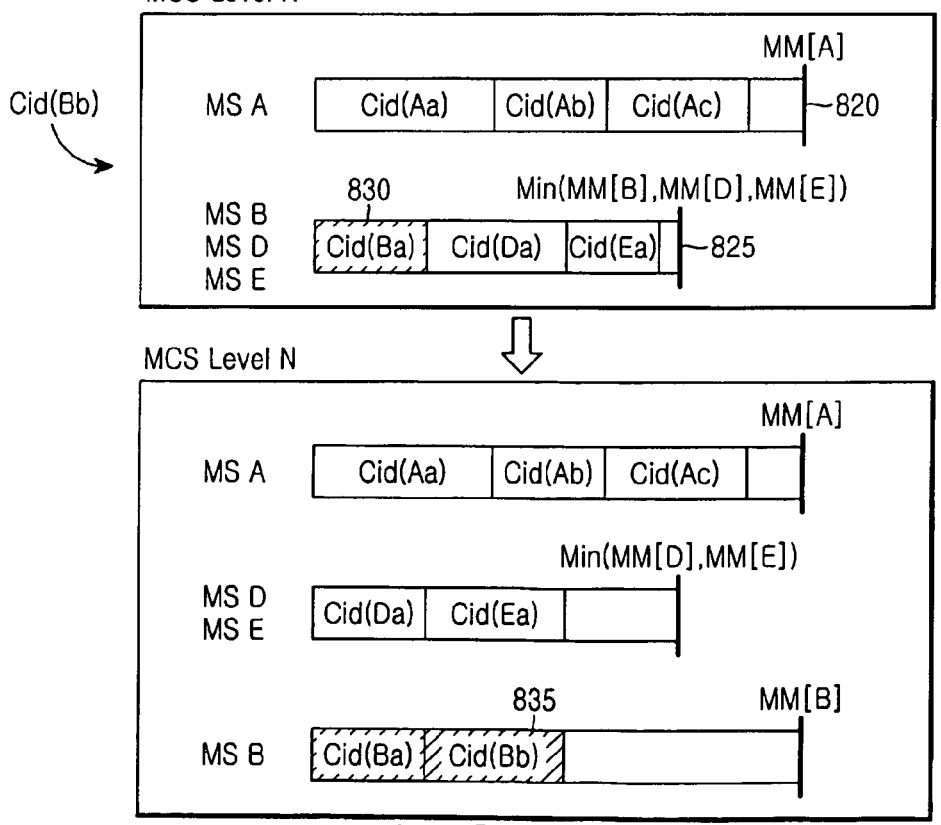

FIGS. 8A and 8B are diagrams illustrating exemplary bursts generated in step 236 of FIG. 2 according to an embodiment of the present invention.

Referring to FIG. 8A, there are a first burst 800 and a second burst 805 as bursts having the same MCS level N as that of a cid(Bb), or a PDU[CID] estimated to be allocated according to the scheduling priority. The first burst 800 is generated only with a cid(Aa), or a PDU[CID] with a Basic CID information of a terminal A. The second burst 805 includes a cid(Ba) 810 having the same Basic CID B as that of the cid(Bb), a cid(da), or a PDU[CID] having a Basic CID D different from the Basic CID information of a terminal B, and a cid(Ea), or a PDU[CID] having a Basic CID information of a terminal E.

In the case where it is not possible to concatenate cid (Ba) having Basic CID of the same terminal B as that of the cid(Bb) to the second burst 805 without fragmentating cid(Bb), The base station removes the cid(Ba) in the second burst 805, and generates a Burst constituting PDU [CID] s with basic cid information of only a terminal B by concatenating the removed cid(Ba) and the cid(Bb). In the case where it is possible to concatenate the Burst constituting PDU[CID]s with basic cid information of only a terminal B to the first Burst without fragmentation, the base station generates a Burst(81) by concatenating the cid(Aa) of the first Bust(800) to the cid(Ba) and the cid(b).

Referring to FIG. 8B, there are a third burst 820 and a fourth burst 825 as bursts having the same MCS level N as that of a cid(Bb), or a PDU[CID] estimated to be allocated according to the scheduling priority. The third burst 820 is generated by concatenating only the PDU[CID]s with a Basic CID information of a terminal A, i.e., cid(Aa), cid(Ab) and cid (Ac). The fourth burst 825 is generated by concatenating cid(Ba), cid(Da) and cid (Ea) having different Basic CIDs information of a terminal B, D and E, respectively. If it is not possible to concatenate the cid(Bb) to the fourth burst including cid (Ba) with the Basic CID of same terminal B as that of the cid(Bb) 825 without fragmentation, the base station removes the cid(Ba) of the fourth burst 825, and then concatenates the removed cid(Ba) and the cid(Bb) to generate a burst 835 having only the PDU[CID]s with only a Basic CID information of a terminal B. In the case where it is not possible to concatenate the firs burst to A burst concatenated the removed cid (Ba) and the cid (Bb), having constituting PDU [CID] s with basic aid information of only a terminal B, the base station generates a Burst(835) by concatenating the cid(Ba) and the cid(Bb).

As is apparent from the foregoing description, the present invention reduces the MAP size by PDU[CID] concatenation during downlink burst allocation in the BWA communication system, thereby contributing to maximization of resource utilization efficiency of the system. In addition, the present invention generates and allocates bursts so that the terminal can decode the bursts, thereby preventing a decoding error from occurring at the terminal due to the possible mismatch of the burst size.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating a base station for generating a burst in a communication system, the method comprising:
estimating a first packet data unit (PDU) allocable according to scheduling priority;
generating a first burst in which the first PDU is to be included; and
determining whether a total size of bursts to be allocated to a downlink subframe including the generated first burst is less than a maximum size of bursts allocable to the downlink subframe,
wherein the generating the first burst comprises:
    determining whether there is at least one second burst having the same Modulation & Coding Scheme (MCS) level as that of the first PDU and generating a first burst in which the first PDU is to be included based at least partly upon the determination;
    when there is no second burst, comparing a size of the first PDU with a first mobile station maximum byte (MM) value indicative of the maximum number of bytes per frame decodable by a terminal scheduled to receive the first PDU; and
    when the size of the first PDU is less than the first MM value, generating the first burst with the first PDU.

2. The method of claim 1, wherein the determining comprises:
estimating a second PDU to be allocated after the first PDU, when the total size of bursts to be allocated to the downlink subframe including the generated first burst is less than the maximum size of bursts allocable to the downlink subframe.

3. The method of claim 2, wherein the first PDU and the second PDU each are one of a packet data unit and a protocol data unit.

4. The method of claim 1, wherein the comparing comprises:
when the size of the first PDU is greater than or equal to the first MM value, fragmenting the first PDU in a size of the first MM value, and generating the first burst with the fragmented first PDU.

5. The method of claim 1, further comprising:
when there are second bursts, determining whether there is a third burst having the same terminal identifier as that of a terminal scheduled to receive the first PDU, among the second bursts;
when there is no third burst, selecting a second burst according to a generated order of the second bursts, and determining whether a size obtained by concatenating PDUs included in the selected second burst and the first PDU is less than a minimum value out of the first MM value and the maximum number of bytes per frame decodable by each of terminals included in the selected second burst; and
when the obtained size is less than the minimum value, generating the first burst by concatenating the PDUs included in the selected second burst and the first PDU.

6. The method of claim 5, further comprising:
when the selected second burst is a last generated second burst, fragmenting the first PDU in a size of the first MM value and generating the first burst with the fragmented first PDU, if the size of the first PDU is greater than the first MM value.

7. The method of claim 5, wherein the determining whether there is a third burst comprises:
when there is a third burst, determining whether a size obtained by concatenating PDUs included in the third burst and the first PDU is less than or equal to a minimum value out of the first MM value and the maximum number of bytes per frame, decodable by each of terminals included in the third burst; and when the obtained size is less than or equal to the minimum value, generating the first burst by concatenating the PDUs included in the third burst and the first PDU.

8. The method of claim 7, further comprising:
when the obtained size is greater than the minimum value, determining whether there is any PDU having a terminal identifier being different from that of the first PDU, in the third burst; and
when there is no PDU having a different terminal identifier, fragmenting the first PDU in a size obtained by subtracting a size of PDUs included in the third burst from the first MM value, and concatenating the fragmented first PDU to the PDUs included in the third burst to generate the first burst.

9. The method of claim 8, wherein the determining whether there is any PDU having a terminal identifier being different from that of the first PDU comprises:
when there is at least one PDU having a different terminal identifier, removing the at least one PDU having a different terminal identifier from the third burst; and
concatenating the removed PDU and the first PDU to generate the first burst.

10. The method of claim 9, further comprising:
when a size obtained by concatenating the removed PDU and the first PDU is greater than the first MM value, fragmenting the first PDU in a size obtained by subtracting the removed PDU from the first MM value to generate the first burst.

11. For use in a wireless network capable of communicating with a plurality of mobile stations, a base station for generating a burst to be transmitted to the plurality of mobile stations, wherein the base station is configured to:
estimate a first packet data unit (PDU) allocable according to scheduling priority;
generate a first burst in which the first PDU is to be included by:
determining whether there is at least one second burst having the same Modulation & Coding Scheme (MCS) level as that of the first PDU,
when there is no second burst, comparing a size of the first PDU with a first mobile station maximum byte (MM) value indicative of the maximum number of bytes per frame, decodable by a terminal scheduled to receive the first PDU, and
when the size of the first PDU is less than the first MM value, generating the first burst with the first PDU; and
determine whether a total size of bursts to be allocated to a downlink subframe including the generated first burst is less than a maximum size of bursts allocable to the downlink subframe.

12. The base station of claim 11, wherein determine whether a total size of bursts to be allocated to a downlink subframe including the generated first burst is less than a maximum size of bursts allocable to the downlink subframe comprises:
estimating a second PDU to be allocated after the first PDU, when the total size of bursts to be allocated to the downlink subframe including the generated first burst is less than the maximum size of bursts allocable to the downlink subframe.

13. The base station of claim 12, wherein the first PDU and the second PDU each are one of a packet data unit and a protocol data unit.

14. The base station of claim 11, wherein the comparing comprises:

when the size of the first PDU is greater than or equal to the first MM value, fragmenting the first PDU in a size of the first MM value, and generating the first burst with the fragmented first PDU.

15. The base station of claim 11, wherein when there are second bursts, the base is further configured to determine whether there is a third burst having the same terminal identifier as that of a terminal scheduled to receive the first PDU, among the second bursts;
when there is no third burst, the base is further configured to select a second burst according to a generated order of the second bursts, and determine whether a size obtained by concatenating PDUs included in the selected second burst and the first PDU is less than a minimum value out of the first MM value and the maximum number of bytes per frame, decodable by each of terminals included in the selected second burst; and
when the obtained size is less than the minimum value, the base is further configured to generate the first burst by concatenating the PDUs included in the selected second burst and the first PDU.

16. The base station of claim 15, wherein when the selected second burst is a last generated second burst, the base is further configured to fragment the first PDU in a size of first MM value and generating the first burst with the fragmented first PDU, if the size of the first PDU is greater than the first MM value.

17. The base station of claim 15, wherein the determining whether there is a third burst comprises:
when there is a third burst, determining whether a size obtained by concatenating PDUs included in the third burst and the first PDU is less than or equal to a minimum value out of the first MM and the maximum number of bytes per frame, decodable by each of terminals included in the third burst; and
when the obtained size is less than or equal to the minimum value, generating the first burst by concatenating the PDUs included in the third burst and the first PDU.

18. The base station of claim 17, wherein when the obtained size is greater than the minimum value, the base is further configured to determine whether there is any PDU having a terminal identifier being different from that of the first PDU, in the third burst; and
when there is no PDU having a different terminal identifier, the base is further configured to fragment the first PDU in a size obtained by subtracting a size of PDUs included in the third burst from the first MM value, and concatenate the fragmented first PDU to the PDUs included in the third burst to generate the first burst.

19. The base station of claim 18, wherein the determining whether there is any PDU having a terminal identifier being different from that of the first PDU comprises:
when there is at least one PDU having a different terminal identifier, removing the at least one PDU having a different terminal identifier from the third burst; and
concatenating the removed PDU and the first PDU to generate the first burst.

20. The base station of claim 19, wherein when a size obtained by concatenating the removed PDU and the first PDU is greater than the first MM value, the base is further configured to fragment the first PDU in a size obtained by subtracting the removed PDU from the first MM value to generate the first burst.

* * * * *